April 3, 1951
W. F. ALLER
2,547,681
LEAD AND PITCH GAUGING DEVICE
Filed March 15, 1944
2 Sheets-Sheet 1
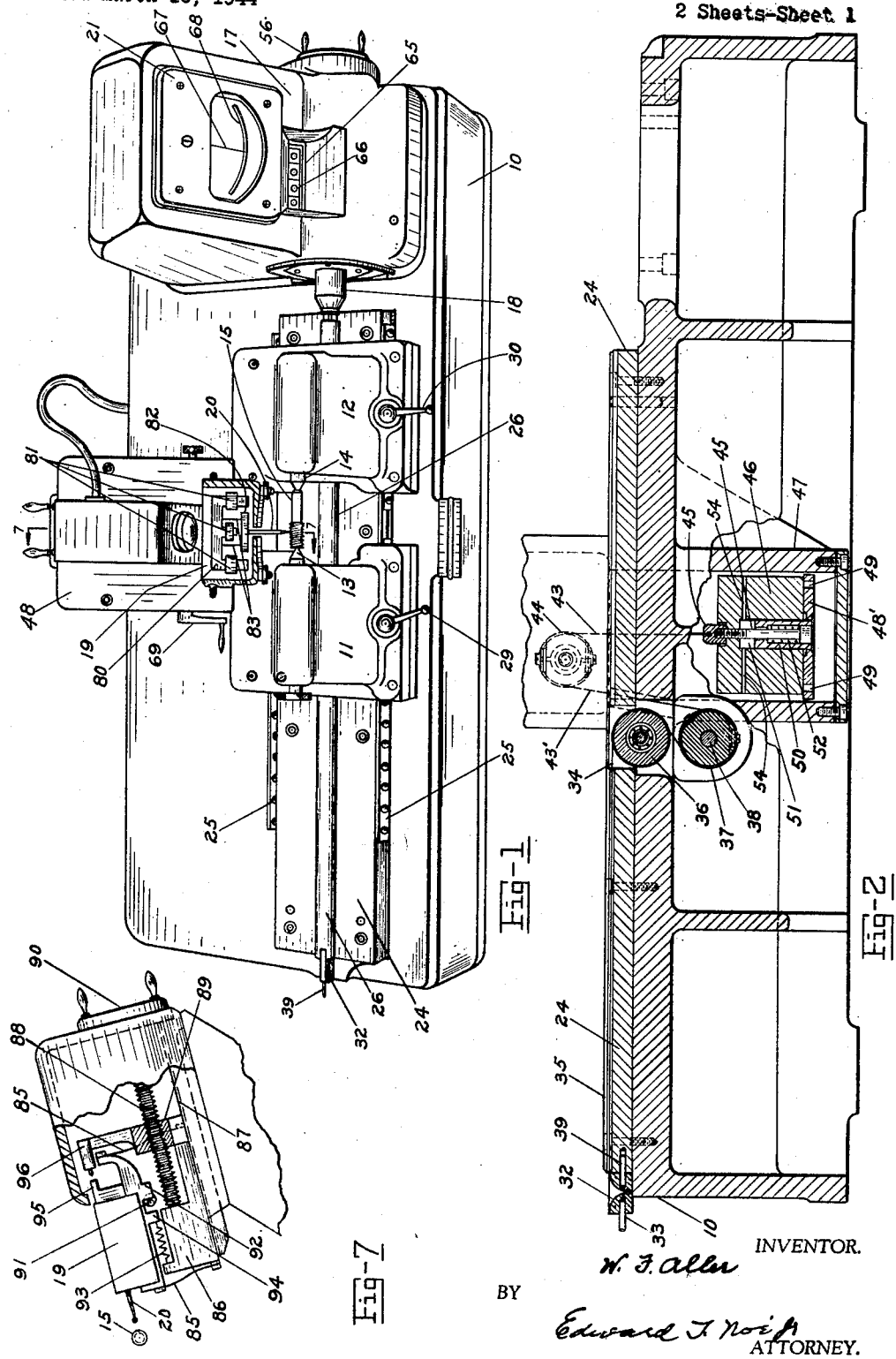
INVENTOR.
W. F. Aller
BY
Edward T. Noié
ATTORNEY.

April 3, 1951 W. F. ALLER 2,547,681
LEAD AND PITCH GAUGING DEVICE
Filed March 15, 1944 2 Sheets-Sheet 2
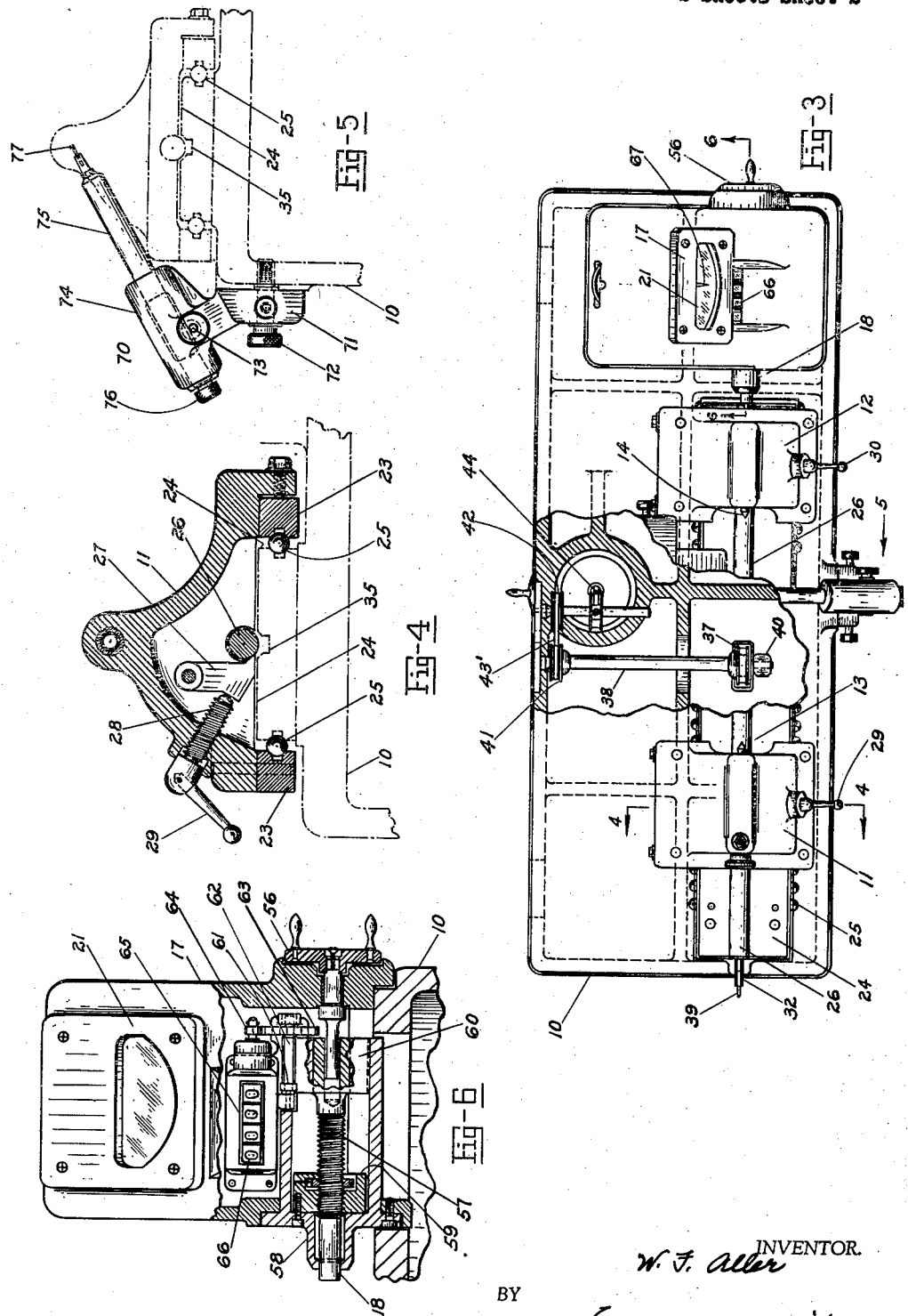
INVENTOR.
W. F. Aller
BY
Edward T. North
ATTORNEY.

Patented Apr. 3, 1951

2,547,681

UNITED STATES PATENT OFFICE 2,547,681

LEAD AND PITCH GAUGING DEVICE

Willis Fay Aller, Dayton, Ohio, assignor to The Sheffield Corporation, Dayton, Ohio, a corporation of Ohio Application March 15, 1944, Serial No. 526,535

8 Claims. (Cl. 33—199)

This invention relates to gauging devices and more particularly to devices for gauging or comparing the correctness of lead or pitch measurement of screw threads.

One object of the invention is to provide a precision gauge for determining the correctnness of the lead of screw threads, that may be conveniently operated to check or test the threads at any desired point along the length of a threaded part and capable of accommodating parts widely differing in size.

Another object is the provision of a gauging device for testing the lead or pitch diameter of screw threads and incorporating a plurality of work holders mounted independently for rectilinear movement and adapted to be releasably interconnected by a longitudinally extending member which operates against a positioning indicating means that shows the extent of longitudinal adjustment of the workpiece.

Another object is the provision of a thread testing gauge, in which the work holders are releasably interconnected to one another by a single longitudinally extending bar which fixes the work holders together as a unit assemblage, the support which carries this unit assemblage also having a gauging device cooperating with the threads on the workpiece, and positioning means cooperating with the unit assemblage for determining the extent of longitudinal adjustment of the workpiece.

Another object is the provision of a gauging device having damping means providing a controlled rate of movement of the work holders towards and against a positioning stop.

Another object is the provision of a thread gauge incorporating a plurality of work holders supported for rectilinear movement on a base with gravity actuated fluid damped means provided in the base for controlling the axial movement of the workpiece with respect to a work engaging measuring device.

Other objects and advantages of the invention will be apparent from the following description, the appended claims and the accompanying drawing, in which, Fig. 1 is a perspective view of a gauging device embodying the present invention;

Fig. 2 is a longitudinal vertical section through the base;

Fig. 3 is a top plan view of the gauging device, a portion of the upper side of the base being removed to illustrate a part of the gravity actuated moving means for the work holders;

Fig. 4 is a section on the line 4—4 of Fig. 3;

Fig. 5 is a side elevation viewed in the direction of the line 5 in Fig. 3, showing the work contacting and locating finger;

Fig. 6 is a vertical section on the line 6—6 of Fig. 3; and

Fig. 7 is a section on line 7—7 of Fig. 1.

Referring more particularly to the drawing, in which the same reference numerals have been applied to like parts in the several views, 10 designates a base of a gauging device for the precision measurement of the pitch diameter or lead of threaded members. The base carries a pair of work holders 11 and 12, having work carrying centers 13 and 14 respectively. These centers support a threaded workpiece, one form of which has been illustrated at 15 although of course threaded parts widely differing in size and diameter can be accommodated by the work centers. The two work holders move as a unit during the gauging operation and are arranged for movement in the direction of the work axis. The position of the holders is determined by a suitable indicating means such as Johansson blocks or a micrometer, generally designated 17 having an adjustable stem 18 which cooperates with the work holding assemblage. The base 10 also carries a gauging unit 19 which is provided with a movable work contacting feeler 20 operable laterally or in the direction of the work axis by contact with the work and relative to this gauging unit. The entire gauging unit 19, as will be presently described, is adjustable towards and from the work axis to accommodate work pieces of different diameters. The gauging unit is also movable on its supporting carriage from a retracted position into an advanced or work engaging position. When the feeler 20 engages the work, the electrical system in the gauging unit produces a reading on an indicating instrument 21 dependent upon the position assumed by the feeler 20.

The two work holders 11 and 12 have downwardly extending side portions 23 arranged outside of a base plate 24. Between each side of the base plate and the side portions 23 of the holders is a ball series 25 which provides an anti-friction support for the holders, permitting their free movement in the direction of or parallel to the work axis. Extending between and slidably guided in the work holders is an elongated member or bar 26 arranged just above the base plate 24 and preferably arranged substantially equidistant from the opposite sides of the work holders, as shown in Fig. 4. The work holder 11 can be releasably secured to the bar 26 at any desired point along the length of the bar by suitable clamping means including a pivoted arm 27 carried by the work holder and engageable with one side of the bar shown in Fig. 4. It may be pressed against the bar by tightening the holding screw 28 and this may be accomplished by turning the handle 29, thus pressing the arm 27 firmly against the bar and securing the bar and the holder together. In a similar manner the other holder 12, which is similar in construction, can be clamped to the bar at any point along the length of the bar by turning the clamp handle 30. Thus the distance between the holders can be readily changed to accommodate workpieces of different lengths, but with both clamping means operative, the two holders and the bar operate as a unit assemblage, supporting the workpiece for axial movement along the base and thus bringing different areas or threads on the workpiece into position opposite the gauging feeler 20. The extent of axial movement of the holders, or the exact amount of movement that is required to bring successive threads or different areas of the workpiece into cooperative relation with the feeler 20, is determined by the micrometer 17 which engages the unit assemblage. As shown in Figs. 1 and 3 the adjustable stem 18 of the micrometer contacts directly with the end of the bar 26, although Johansson blocks may be employed between these parts.

The bar 26 is connected at one end thereof with a controlling device that urges the bar, and thus the work holders, into engagement with the stem 18. The construction is such that the work holders and the bar will move slowly into contact with the stem of the micrometer although comparatively rapid movement of the work holders can take place in the opposite direction. As shown, the left hand end of the bar 26 is engaged by a connector 32 having a pin 33 which is insertable in a socket in the end of the bar, the connector 32 having a flexible cable 34 secured to it. This cable extends along a groove 35 in the base plate 24, see Figs. 2 and 4, and is arranged over a freely rotatable guide pulley 36 and wrapped around a drum 37 which is fixed on a shaft 38. This shaft, as will be presently described, is controlled by a weight so that a constant tension is exerted on the cable 34. With the connector 32 attached to the bar as indicated in Fig. 1, a constant force is thus exerted on the bar tending to move it to the right and into contact with the stem 18. The connector 32 can be pulled free from the bar and secured to the base at a point below the end of the bar. For this purpose the connector is provided with a second pin 39 which can be inserted into a socket in the end of the base plate 24 as shown in Fig. 2.

The shaft 38 that carries drum 37 is mounted in suitable bearings 40 in the base below the holders and this shaft also carries a second drum 41. A flexible cable or belt 43' is attached at one end to this drum 41 and at its other end is attached to a drum 42 which is fixed coaxially with a drum 44, see Fig. 4. A cable 43 is wound on and extends over drum 44 and then downwardly, the lower end of this cable being secured to a threaded stud 45 which is fixed to a weight 46. This weight thus exerts a turning force on the shaft 38 and applies a constant tension on the cable 34.

The weight 46 is arranged in a cylinder 47 within the base and below the upward extension 48 of the base structure, this upward extension housing the shaft on which the drum 44 is arranged. Cylinder 47 contains a quantity of oil or other suitable liquid, and the weight is valved so that it can descend in the cylinder only at a slow rate of speed, with the damping liquid flowing slowly around the outside of the weight. However, the weight can be moved upwardly comparatively rapidly when a force is applied to the work holders to move them to the left. For the control of the weight movements the latter has a valve plate 48' provided with passages 49 and having a hollow stem 50 which is operable in a chamber 51 in weight 46. The stem 50 and valve plate 48 are vertically movable with respect to the weight, spring 52 applied between the upper end of the stem 50 and a flange on the lower end of the stud 45 serving to yieldingly hold the valve plate up against the lower side of the weight and close the passages 49 so that fluid can be displaced from below the weight only by passing around the outside of the valve plate 48 through the small clearance between the valve plate and the cylinder. Thus the rate of descent of the weight is effectively controlled to some safe value that prevents the bar 26 from jarring the stem 18. However, the bar can be moved comparatively rapidly in a direction away from the stem 18 because an upward movement of the weight immediately pulls the weight away from the upper side of the valve plate 48 and permits fluid to flow downwardly through the clearance space around the weight and through the passages 49 which are opened. Fluid relief passages 54 extend laterally from the chamber 51 to the outside of the weight to permit freedom of movement of the stem 50 in the chamber 51.

The micrometer 17, as shown in Fig. 6, incorporates a hand wheel 56 which turns the micrometer screw 57 through a telescopic connection. The screw projects through the frame structure 58 and forms the micrometer stem 18. Screw 57 is threaded in a nut 59 and is also provided with a gear 60 of considerable length, engaging a pinion 61 on shaft 62. The latter is fixed to a large gear 63 engaging pinion 64 which turns a counting mechanism 65. The indications of the counter are apparent through the several windows 66, which directly show the decimal parts of an inch, corresponding to the adjustment given to the stem 18 as handle 56 is turned. Thus an exact adjustment can be given to the stem 18 so as to cause an axial movement of the workpiece precisely equal to the desired pitch measurement of the thread on the workpiece, or any other value within the range of movement of the stem 18.

The micrometer housing forms a support for the indicating instrument 21 which is controlled by the movement of the feeler 20 on the gauging unit 19. The instrument 21 has a pointer 67 and a scale 68, the position of the pointer being controlled by current flow in a circuit including the gauging unit 19. The latter may incorporate an electromagnetic system providing a core 80 having windings 81, and a movable armature 82 which is movably supported by a pair of parallel flexible spring blades 83. The armature 82 has the feeler 20 fixed to it. The unit 19, as shown in Fig. 7 is supported for bodily movement towards and from the work center by means of parallel flexible spring blades 85 supported at their lower ends on a carriage 86. The latter is slidably mounted on guide ways 87 on the base structure and is operated by a screw 88 which engages a threaded portion 89 of the carriage and which is controlled by the hand wheel 90. By turning this wheel the entire carriage together with the gauging unit 19 can be moved bodily in a direction perpendicular to the work axis. The gauging unit 19 can be advanced to the work, or retracted on its supporting carriage 86 by turning the crank handle 69 which operates a cam or eccentric 91 towards the right from a limiting position shown in Fig. 7, thus pushing to the right on a lug 92 fixed to the gauging unit 19. Movement of the cam or eccentric 91 into the position shown permits the gauging unit to move towards the work axis, this unit being urged to the left by a tension spring 93 connected at its left end to the carriage 86 and at its other end to a lug 94 on the gauging unit. In its work engaging position, indicated in Fig. 7, the gauging unit has an exact predetermined position on the carriage, determined by the cam 91. The gauging unit 19 has a lug 95 which engages and opens switch 96 carried on the carriage 86, this switch being arranged in the circuit between the electromagnetic unit 19 and the instrument 21.

With the feeler 20 in engagement with one side of a thread, preferably at or near the pitch diameter, the gauging unit carriage is adjusted to give a zero indication of the pointer 67, and the reading on the counter 65 is noted. The handle 69 is then operated to withdraw the unit 19 rearwardly from the workpiece to a retracted position determined by the lug 94. The hand wheel 56 is then turned to move the stem 18 of the micrometer an amount equal to the distance between one thread and the next, the weight 46 causing the work holders to slowly follow the stem 18. Handle 69 is then turned to move the unit 19 to its normal gauging position determined by the lug 92, and if the thread lead or pitch is of exact size, and the pitch diameter of this second thread is the same as the first, the pointer 67 will show the same reading as before. The extent of movement of the pointer 67 shows the amount that the thread pitch varies from normal at the particular point on the thread contacted by the feeler 20. Either the thread diameter or the thread pitch can be accurately gauged at different threads along the length of the workpiece in this manner, through the range of travel of the adjustable stem 18. The range of movement of the stem 18, however, is limited as compared with the total range of movement of the work holders on the base, and spacing blocks of exact and known size are applied between the end of the bar 26 and stem 18, to permit checking or comparing of a workpiece of considerable length.

The annular accuracy or drunkenness of a thread can be readily determined by turning the workpiece on its own axis while the workpiece engages the feeler 20 and with locating means applied to the workpiece itself to provide a controlled longitudinal movement of the workpiece during its rotation. For this purpose, an attachment 70, see Fig. 5, may be applied to the base. This attachment incorporates a support block 71 which is held firmly on the front wall of the base by an attachment screw 72 engaging a threaded passage in the base. Pivotally mounted on the support block 71 for movement about an axis 73 is an internally threaded barrel 74 which carries a rod 75. This rod is threaded in the barrel 74 and can be adjusted by turning its projecting end 76 to move it in an axial direction towards or from the workpiece center. The rod 75 is provided with a thread engaging ball 77 which is brought to bear against the threads of the workpiece by suitable adjustment of the end 76. Since the rod 75 cannot move in a direction of the work-axis, it locates the work and produces a longitudinal movement of the workpiece as the operator turns the workpiece on its axis. In checking the thread drunkenness, the connector 32 is released from the bar 26 and its pin 39 applied to the end of the base plate 24 as shown in Fig. 2, and the end of the bar is spaced away from the end of the micrometer stem 18. As the workpiece is turned on its own axis, if the thread is perfectly uniform, the position of the pointer 67 will remain the same, since the threads will not move the feeler 20. Any movement of the feeler 20 from a normal position corresponding to a zero indication of the pointer 67 will show a departure in the thread form from normal.

While the form of apparatus herein described constitutes a preferred embodiment of the invention, it is to be understood that the invention is not limited to the precise form herein described, and that changes may be made therein without departing from the scope of the invention which is defined in the appended claims.

What is claimed is:

1. A gauge for threaded workpieces comprising a base, a pair of work holders having work carrying centers and independently guided for movement in one direction on said base, an elongated bar extending through said holders for interconnecting said holders in relatively fixed relation and movable along the base with said holders, said bar being devoid of any bearing engagement with the base except through said work holders, means for releasably fastening one of said holders to said bar at various positions along its length, gauging means adapted for cooperation with a threaded workpiece carried by said centers, and means on said base operated by one end of said bar for measuring the changes in position of the bar on the base.

2. A gauge for threaded workpieces comprising a base, a pair of work holders having work carrying centers and independently guided for slidable movement in one direction directly on said base, said holders having aligned holes extending parallel to the direction of movement of the work holders on the base, a single straight bar extending through said holes and interconnecting said holders in relatively fixed relation, means for releasably fastening one of said holders to said bar at various positions along its length, gauging means adapted for cooperation with a threaded workpiece carried by said centers, and means on said base operated by one end of said bar for measuring the changes in position of the bar on the base.

3. A gauge of the character described comprising a base, a pair of work holders having work carrying centers and each independently mounted for antifriction movement in one direction directly on said base, antifriction means between the base and said work holders, a bar of circular cross section extending centrally through said holders and interconnecting said holders in relatively fixed relation, said bar being devoid of any bearing engagement with the base except through said work holders means for releasably fastening each of said holders to said bar at various positions along the bar, gauging means adapted for cooperation with a workpiece carried by said centers, indicating means on said base operated by one end of said bar for measuring changes in the position of the bar on the base, and means for urging said bar into abutting relation with said indicating means.

4. A gauge for threaded workpieces comprising a base, a pair of work holders having work carrying centers and independently mounted for movement in the same direction on said base, a single straight bar extending through said holders for relatively fixing said holders with respect to one another, said holders and bar constituting a rigid assemblage movable along said base as a unit, means for releasably fastening one of said holders to said bar at various positions along its length, gauging means carried by said base adapted for cooperation with a threaded workpiece carried by said centers, means on said base operated by the end of said bar for measuring changes in its position on the base, a groove in said base immediately below said bar, a cable operable along said groove and having an attachment at one end thereof, said bar having at a freely accessible portion provision for quickly connecting the attachment of said cable, and means for exerting a predetermined pull on said cable to urge the bar toward said measuring means.

5. A gauge for threaded workpieces comprising a base, a pair of work holders having work carrying centers, means independently supporting said holders directly on said base for movement in the same direction on said base, a bar extending through said work holders for relatively fixing said holders with respect to one another, said holders and bar constituting a rigid assemblage movable along said base as a unit, means for releasably fastening said holders to said bar at various positions along its length, gauging means carried by said base adapted for cooperation with a threaded workpiece carried by said centers, indicating means on said base operated by said assemblage for measuring changes in its position on the base, gravity means for urging said assemblage against said indicating means including a pull cable having an attachment at one end thereof, one end of said bar and said base both having provision at freely accessible portions thereof for detachable interfitting engagement with the attachment of said cable so that the cable can be connected to either the bar or the base.

6. A gauge for threaded workpieces comprising a base, a pair of work holders mounted on said base for rectilinear movement and having work supporting centers on which a workpiece may be rotatably mounted for movement about its own axis, means securing said work holders one to the other in adjustably fixed relationship for simultaneous movement along said base, gauging means on said base adapted for cooperation with the threads on a workpiece carried by said holders, and a thread engaging index fixed on said base and projecting into engagement with a thread on the workpiece to produce controlled axial travel of the workpiece and the holders when the workpiece is rotated.

7. A gauge for threaded workpieces comprising a base, a pair of work holders independently mounted directly on said base for rectilinear movement and having work supporting centers on which a workpiece may be rotatably mounted for movement about its own axis, means securing said work holders one to the other in adjustably fixed relationship for simultaneous movement along said base, a thread engaging index fixed on said base and projecting into engagement with a thread on the workpiece to produce controlled axial travel of the workpiece and the holders when the workpiece is rotated, means for adjusting the position of said index in a plane transverse of the work axis, and gaging means carried by said base adapted for cooperation with the threads on the workpiece.

8. In a gauging device of the character described, a base, a pair of work holders having work carrying centers and independently mounted for rectilinear movement in the same direction on said base, a bar extending between and through said holders for relatively fixing said holders with respect to one another, means for releasably fastening said holders to said bar at various positions along its length, gauging means adapted for cooperation with a threaded workpiece carried by said holders, means on said base adapted for cooperation with one end of said bar for determining the changes in position of said holders with respect to said gauging means, weight means within said base, a connection member adapted for attachment either to the end of the bar or to the base said base and one end of said bar both having provision at freely accessible portions thereof for detachable interfitting engagement with said connection member so that such member can be connected to either the bar or the base, and a flexible connection between said weight means and said connection member.

WILLIS FAY ALLER.

REFERENCES CITED

The following references are of record in the file of this patent:

UNITED STATES PATENTS

| Number | Name | Date |
| --- | --- | --- |
| 1,292,235 | Beckett | Jan. 21, 1919 |
| 1,456,938 | Schoof | May 29, 1923 |
| 1,470,836 | Hill | Oct. 16, 1923 |
| 1,503,320 | Hardel | July 29, 1924 |
| 1,528,314 | Wickman | Mar. 3, 1925 |
| 2,321,903 | Fox | June 15, 1943 |
| 2,342,539 | Gorton | Feb. 22, 1944 |

FOREIGN PATENTS

| Number | Country | Date |
| --- | --- | --- |
| 140,611 | Great Britain | Apr. 1, 1920 |
| 394,821 | Great Britain | July 6, 1933 |